United States Patent [19]
Hollenbach

[11] Patent Number: 5,833,359
[45] Date of Patent: Nov. 10, 1998

[54] CLAMP MOUNTED LAMP

[75] Inventor: Gerald A. Hollenbach, Aloha, Oreg.

[73] Assignee: Bonnie L. Shreve, Auburn, Wash.

[21] Appl. No.: 825,001

[22] Filed: Mar. 26, 1997

[51] Int. Cl.⁶ .................................................. F21V 21/26
[52] U.S. Cl. .................... 362/250; 362/238; 362/371; 362/396; 362/427; 269/6; 269/11; 269/170
[58] Field of Search ............... 248/229.12, 229.22, 248/230.3, 231.41; 269/6, 11, 167, 169, 170; 362/238, 239, 250, 371, 396, 418, 427

[56] References Cited

U.S. PATENT DOCUMENTS

| | | | |
|---|---|---|---|
| 4,528,622 | 7/1985 | Bacevius | 362/396 |
| 4,926,722 | 5/1990 | Sorensen et al. | 269/6 |
| 5,354,030 | 10/1994 | Harwood | 362/396 |
| 5,448,463 | 9/1995 | Leen | 362/396 |
| 5,510,970 | 4/1996 | Hollenbach et al. | 362/396 |
| 5,584,457 | 12/1996 | Fawcett | 362/396 |
| 5,584,458 | 12/1996 | Rando | 248/231.41 |

FOREIGN PATENT DOCUMENTS 934765  1/1948  France ...................................... 269/11

*Primary Examiner*—Alan Cariaso
*Attorney, Agent, or Firm*—Delbert J. Barnard

[57] ABSTRACT

A portable light fixture uses a bar clamp which is operable with one hand and includes a fixed jaw and a movable jaw. The movable jaw includes a one-way drive mechanism, which releasably engages a slide bar and advances the movable jaw toward the fixed jaw, and permits clamping to be accomplished by application of clamping pressure through the one-way drive mechanism.

18 Claims, 2 Drawing Sheets

CLAMP MOUNTED LAMP

TECHNICAL FIELD

This invention relates to lighting and more particularly to a halogen light fixture which can be clamped to a supporting structure for removably mounting the fixture.

BACKGROUND OF THE INVENTION

A standard halogen light fixture has a threaded fitting from which electrical supply wires project. It is intended that the halogen fixture then be permanently mounted to an electrical box, for example, on the outside of a house to provide security illumination for the house. The fixtures are not provided with plugs which would allow them to be connected to conventional household receptacles, but instead have pigtail wires which are intended to be permanently wired by an electrician to an electrical supply.

It is often desirable to employ a halogen lamp for work site illumination on a temporary basis, not as a permanent installation. A conventional work lamp is connected to the utility supply through a standard plug and receptacle. Because the standard halogen fixture is not equipped with a plug, it is not suited for use with a standard household receptacle as a portable work lamp.

Recently, various modifications to such halogen light fixtures have permitted use of the light fixtures as portable work lights. These include tripod stands and the like, wherein a standard electric plug is used. U.S. Pat. No. 5,510,970 describes a light fixture with a spring-loaded clamp. In that configuration, a spring-loaded furniture clamp is used to temporarily secure a halogen lamp to a structure to which the clamp sticks. Such an arrangement has two limitations: (1) The structure to which the lamp is temporarily mounted must be within an appropriate range for the clamp. In the case of spring-loaded clamps, this is controlled by a predetermined range of the jaw opening, which is generally a function of the length of jaw arms. For example, a clamp which can be attached to a two-by-four wooden beam across the narrow width of the two-by-four would probably not be suitable to clamping across a door threshold which is considerably wider. (2) The gripping force of the combination is necessarily limited to the spring force of the clamp, as combined with the frictional characteristics of the clamp jaws. Therefore, the weight which may be carried, particularly in an inverted position, is limited to the spring force, which is limited by the hand strength of the user and the length of the grip handles.

Portable multiple lamp fixtures with halogen lights have been available, but are generally large and cumbersome. In the case of a tripod, such portable lamps are easy to tip over. This problem is only partially remedied with a conventional clamp-on lamp which uses a spring clamp. If the lamp is placed in an inappropriate location, the clamp-on lamp could also be knocked down. It is therefore desired to provide a clamp-on light fixture which is more secure, and to provide a multiple lamp fixture which is less cumbersome than conventional tripod lamps and which is also less likely to be tipped.

It is therefore desirable to provide a halogen lamp for work site illumination which may be securely clamped to a wide variety of structures. It is desired to provide such a lamp which is not directly dependent upon conventional spring-loaded jaws and which can be secured with a greater degree of pressure than may be afforded by spring-loaded jaws.

It is often desired to provide lighting which is free of blind spots. In the case of spot lights, it is possible to generate indirect lighting, but this is limited when a single spotlight is used. For this reason, it is common to use multiple spotlights. Thus it is easier to position two lights to provide a desired lighting effect than it is to position a single light. This is particularly true in the case of undirected flood lights, where lighting from a single fixture in two directions can provide substantial advantages over that afforded by a single flood light.

It is desirable to provide a multiple flood light configuration in which the flood light can be easily mounted in a single step, despite the fact that two lights are being used. It is desired that, despite the fact that two lights are being used, the temporary support be secure so that the light does not fall or otherwise create a hazard.

SUMMARY OF THE INVENTION

In accordance with the present invention, a winching bar clamp is used to secure a lighting fixture to a stationary structure. The ability to secure the lamp to structures is limited by the lengths of the bar clamp and its jaws, and by the ability of the bar clamp to exert clamping force on the building structure.

By "building structure" it meant to include any convenient structure, including parts of the building, furniture, and even natural objects such as tree branches.

A lamp according to the present invention preferably includes a halogen light fixture with a base member which can be used for mounting the lamp. A three-wire electrical cord supplies electricity to the base member and the base member is attached to a clamp so that the lamp may be mounted as a work lamp on a temporary or semi-permanent basis at a work site by securing the clamp to a support. The electrical cord may then be connected to a standard electrical outlet for providing power to the lamp.

According to a preferred embodiment of the invention, a pair of halogen lamps are attached to a bar clamp. The bar clamp includes a fixed jaw attached to one end of a slide bar. One lamp is attached to the fixed jaw and the other lamp is attached to the slide bar at an end opposite the end to which the fixed jaw is attached. A handle/grip assembly includes a sliding jaw and is used to clamp the bar clamp with the lamps to the building structure.

DETAILED DESCRIPTION OF THE PREFERRED EMBODIMENTS

Figure 1:
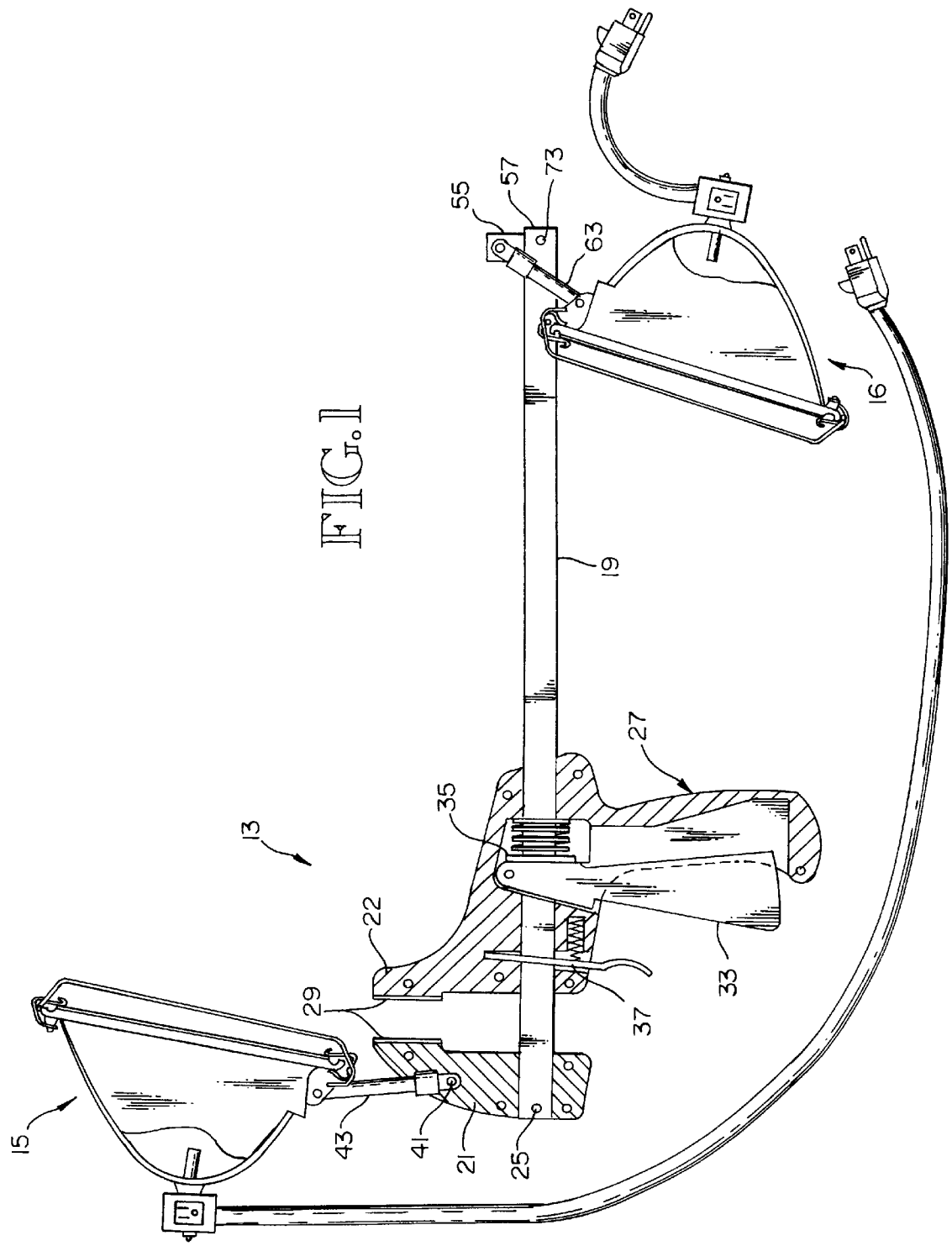
FIG. 1 shows a side view of a preferred embodiment of the lamp according to the present invention.

Referring to FIG. 1, the lamp 11 includes a bar clamp 13 and a pair of halogen lamp units 15, 16. The clamp includes a slide bar 19, and a pair of jaws 21, 22. Jaw 21 is a fixed jaw and is attached at one end of the slide bar 14 by a fastener 25. Jaw 22 is a moving jaw and is a part of a handle/grip assembly 27. Protective pads 29 are placed on the jaws 21, 22. The protective pads 29 preferably resilient material, which reduces damage to clamped surfaces and assists in clamping effect.

A trigger handle 33 operating against a driving lever 35 and a braking lever 37 are used to effect clamping. Unclamping and free retraction of the handle/grip assembly 27 can be achieved by moving the braking lever 37. A description of the operation of the clamp itself is described in U.S. Pat. No. 4,926,722.

In the case of the present invention, a mounting structure is selected for clamping instead of a workpiece, although the clamp 13 could be used for ordinary workpiece clamping functions. The mounting structure may be a part of a building structure, table, ladder or the like. When the mounting surface is clamped between the jaws 21, 22, the movable jaw 22 can be advanced toward the fixed jaw 21 either in one continuous motion, or by operating the trigger handle 33 in a series of strokes of length to be determined by the user. Large strokes may be used at first and small strokes later as the desired pressure is applied to the workpiece. During this advancing operation, the braking lever 37 prevents any backward motion of the slide bar 19 after each advance has been completed. At any time when the user desires to open the bar clamp, it is only necessary to pull on the movable jaw 22 away from the fixed jaw 21 while simultaneously pressing on the braking lever 37.

The fixed jaw 21 is provided with a first mounting hole 41. A mounting bracket 43 is fastened to the fixed jaw 21 at the first mounting hole 41. Halogen lamp unit 15 is, in turn, mounted to the mounting bracket 43 so that the lamp unit 15 is carried by the fixed jaw 21.

A mounting boss 55 is fixed to the slide bar 19 at a free end 57 of the slide bar 19. A second mounting bracket 63 is fastened to the mounting boss 55 and lamp unit 16 is, in turn, mounted to a second mounting bracket 63.

In the preferred embodiment, the mounting boss 55 is fusion bonded to the slide bar 19. It is alternatively possible to provide a mounting hole 73 in the slide bar 19. This is readily accomplished because in the bar clamp described in U.S. Pat. No. 4,926,722, a transverse pin is used to retain the handle/grip assembly 27 on the slide bar 19. By fastening mounting bracket 63 directly to the slide bar 19, it is possible to eliminate the transverse pin.

Figure 2:
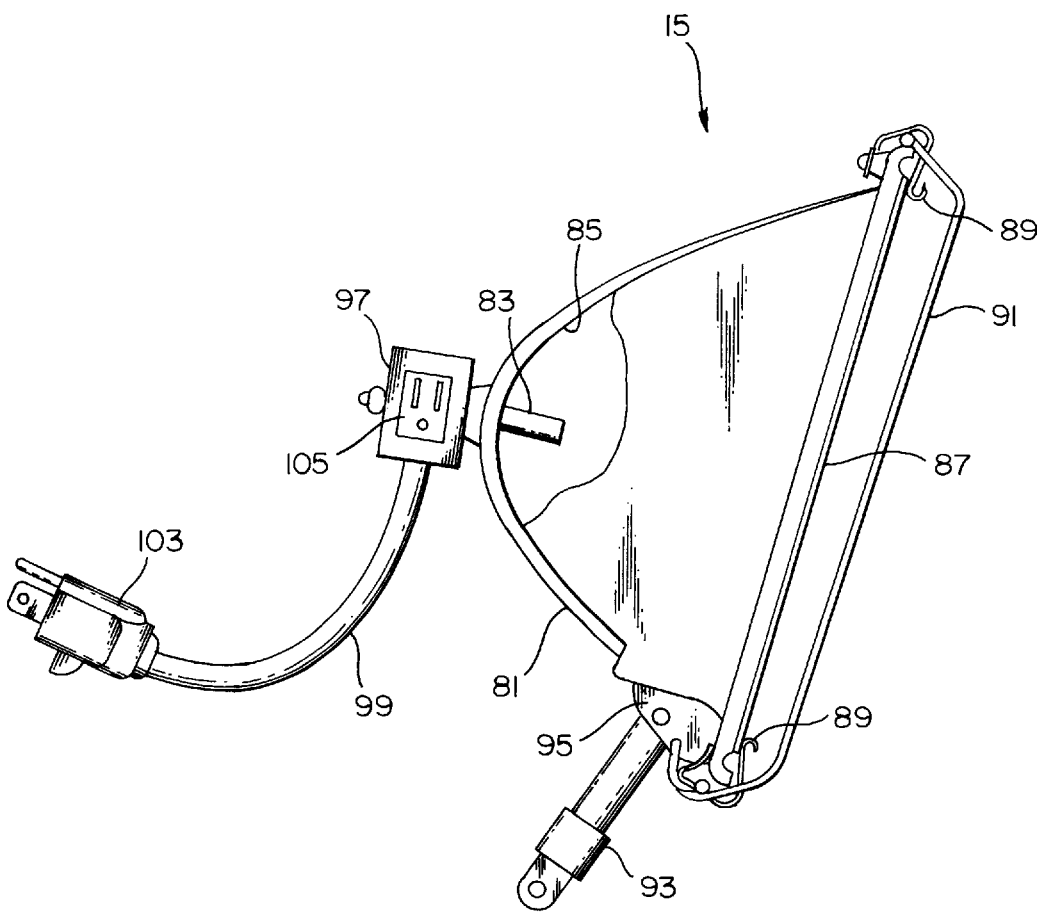
FIG. 2 shows details of a lamp unit used with a preferred embodiment of the invention.

Referring to FIG. 2, each lamp unit 15, 16 include a halogen light fixture housing 81 which contains a halogen light source 83 within a reflector cavity 85. The lamp unit 15 may also include a glass face plate 87 held in relation to the housing 81 via mounting clips 89. A wire guard or metal grid 91 mounted in spaced relation with the face plate glass 87 protects the glass against breakage from impact. The lamp unit 15 carries mounting swivel 93 which enables the lamp unit 15 to pivot. A rotation joint 95 permits further rotation. Both the mounting swivel 93 and rotation joint 95 form pivotal connections, in that they permit articulation of the lamp units 15, 16. Such articulation can be referred to as pivoting and the pivoting may include swivelling movement or single axis rotation according to particular design of the articulating joint. The particular arrangement of the swivel 93 and rotation joint 95 is a matter of design convenience, and either component may be fixed to the lamp unit 15, 16. In addition, it is possible to combine one or more of the features of the swivel 93 and rotation joint 95 with those of the mounting bracket 43 or 63.

An electrical housing 97 is provided either as a part of the housing 81 or as a separate unit. There are several options for mounting the electrical housing 97, including below the housing 81, as an integral part of the housing 81 or behind the housing 81 below the bulb connection. It is also possible to use electrical housing 97 to mount the lamp units 15, 16 such as shown in U.S. Pat. No. 5,510,970.

An electrical cord 99 is allowed to pass through an opening into the electrical housing 97, and is connected to the light source 83 through an appropriate switch assembly 99. In the preferred embodiment, the electrical cord 99 is a three-wire medium capacity electrical cord having sixteen gauge wiring. The far end of the cord on one of the lamp units 15 terminates in a standard three-prong plug 103 which is adapted to be inserted into a conventional household electrical service outlet. That lamp also has a socket 105, which may be fixed to the electrical housing 97, on electrical cord 101 or another cord (not shown). The far end of the cord on the other lamp unit 16 terminates in a three-prong plug and also has a three-prong socket 105 attached. This allows one lamp unit 15 or 16 to plug into the other, thereby enabling electrical supply connection with a single plug connected to a service outlet. In another embodiment, a single line cord with a standard three-prong plug 103 is provided from one of the lamps 15. A second line cord (not shown) interconnects the two lamp units 15, 16. It is possible to provide sockets 105 for both lamp units 15, 16.

There are a number of ways to connect the two lights to a power source, and the particular configuration will be one of manufacturing and user convenience. It is possible to use a separate junction box (not shown) or a molded junction (not shown). Advantageously, if a free socket outlet 105 is provided, the lamp 11 also functions as an extension cord. Since the bar clamp 13 can be used to provide a secure temporary mounting, it is possible to plug electrical equipment into the lamp 11 without tipping the lamp, provided the bar clamp 13 is appropriately mounted to an external structure.

The mounting swivel 93 and rotation joint 95 may be attached as an assembly directly to the light fixture housing 81, as shown or to the electrical housing 97. In either case, the bar clamp 13 secures the lamp 11 generally between the two lamp units 15, 16. If light is to be projected in a direction to one side of a clamped structure, the arrangement of the lamp units 15, 16 on the clamp 13 permits a fair amount of freedom of movement in focusing one of the lamp units 15, 16. The other one of the lamp units 15, 16 must be positioned to focus light past the clamped structure, but the swivel 93 and rotation joint 95 facilitate this. There are a number of design options for attaching the lamp units 15, 16 to the bar clamp 13, although it is desirable that both lamp units 13, 16 be positionable with respect to the bar clamp 13.

The arrangement of the present invention also permits the bar clamp 13 to be used to secure a workpiece in a clamped condition. This facilitates using the lamp units 15, 16 to apply heat to the workpiece. Since the lamp units 15, 16 are secured to the clamp 13, they can conveniently be directed to a glue joint or other location on the workpiece if application of heat or light energy is desired.

Conveniently, the design of the lamp units 15, 16 is such that they are sufficiently waterproof for use in outdoor locations. The face plate glass 87 is suitably sealed against the housing 81, and the remaining components are such that the lamp units 15, 16 are suitable for use in outdoor environments.

Within the interior of the electrical housing 97, the electrical cord 101 has a ground lead electrically connected to the body of the electrical housing 97, thereby providing a grounded connection. In addition, the cord 101 is preferably appropriately sealed for outdoor use.

To use the lamp according to the present invention, the clamp is secured to a mounting surface, and the lamp units 15, 16 are plugged into a suitable service outlet. Each lamp unit 15 may then be swiveled about its swivel 93 and rotated around rotation joint 95 to provide a desired orientation and direction for optimal lighting conditions. The swivel 93 and the rotation joint 95 each provide ability to articulate the lamp units 15, 16. The lamp units 15, 16 may be interchanged and may be placed at other locations on the clamp, including on the movable jaw 22.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. a) a bar clamp comprising fixed portion including a slide bar and a fixed jaw fixed to the slide bar;
   b) a movable jaw carried by a movable jaw assembly for opposing said fixed jaw, said movable jaw assembly resting on said slide bar, and movable along said slide bar to bring said movable jaw toward and away from said fixed jaw;
   c) the movable jaw assembly including a one-way drive for releasably engaging and, when engaged, for advancing said movable jaw assembly along the slide bar, said movable jaw assembly being subject to advancement toward and away from said fixed jaw when said one-way drive is disengaged;
   d) said one-way drive having a driving lever, and a braking lever normally engaging said slide rod, said braking lever when engaging said slide bar preventing motion of said movable jaw away from said fixed jaw, and when disengaging said slide bar allowing advancement of said movable jaw away from said fixed jaw, said braking lever having an engaging portion extending outwardly from said movable jaw assembly;
   e) a trigger handle pivotally mounted to said movable jaw assembly rearwardly of said braking lever and contacting said driving lever;
   f) said engaged driving lever moving said slide rod and said movable jaw toward said fixed jaw;
   g) said movable jaw assembly including a handgrip, a trigger-type relationship existing between said trigger handle and said handgrip, said bar clamp gripped at said handgrip, said braking lever and the trigger handle selectively operable by the same hand in such a manner that one of the index and middle fingers is positioned on the engaging portion of the braking lever to actuate the braking lever, while the other fingers encircle and contain the trigger handle and the handgrip;
   h) a light fixture pivotally mounted to said bar clamp,
   i) said light fixture mounted to the fixed portion of the clamp at a location of the fixed jaw; and
   j) a second light fixture mounted to the fixed portion at a free end of the slide bar, said free end at an opposite extreme of the slide bar from the fixed jaw.

2. a) a bar clamp comprising fixed portion including a slide bar and a fixed jaw fixed to the slide bar;
   b) a movable jaw carried by a movable jaw assembly for opposing said fixed jaw, said movable jaw assembly resting on said slide bar, and movable along said slide bar to bring said movable jaw toward and away from said fixed jaw;
   c) the movable jaw assembly including a one-way drive for releasably engaging and, when engaged, for advancing said movable jaw assembly along the slide bar, said movable jaw assembly being subject to advancement toward and away from said fixed jaw when said one-way drive is disengaged;
   d) said one-way drive having a driving lever, and a braking lever normally engaging said slide rod, said braking lever when engaging said slide bar preventing motion of said movable jaw away from said fixed jaw, and when disengaging said slide bar allowing advancement of said movable jaw away from said fixed jaw, said braking lever having an engaging portion extending outwardly from said movable jaw assembly;
   e) a trigger handle pivotally mounted to said movable jaw assembly rearwardly of said braking lever and contacting said driving lever;
   f) said engaged driving lever moving said slide rod and said movable jaw toward said fixed jaw;
   g) said movable jaw assembly including a handgrip, a trigger-type relationship existing between said trigger handle and said handgrip, said bar clamp gripped at said handgrip, said braking lever and the trigger handle selectively operable by the same hand in such a manner that one of the index and middle fingers is positioned on the engaging portion of the braking lever to actuate the braking lever, while the other fingers encircle and contain the trigger handle and the handgrip;
   h) a light fixture pivotally mounted to said bar clamp,
   i) said light fixture mounted to the fixed portion at a location on the fixed jaw;
   j) a second light fixture mounted to the fixed portion at a free end of the slide bar, said free end at an opposite extreme of the slide bar from the fixed jaw; and
   k) each of said light fixtures including a cavity for housing an elongate halogen light source, a pair of contacts on each side of said cavity for receiving the elongate halogen light source, said pair of contacts including one spring biased contact, an opening in said fixture to said cavity, a lens disposed over said opening, a guard disposed over said lens, a reflector for directing light, an electrical power cord having power cord wires therein for connecting said lamp to a power source, and a ground wire electrically connected to said fixture.

3. a) a bar clamp comprising fixed portion including a slide bar and a fixed jaw fixed to the slide bar;
   b) a movable jaw carried by a movable jaw assembly for opposing said fixed jaw, said movable jaw assembly resting on said slide bar, and movable along said slide bar to bring said movable jaw toward and away from said fixed jaw;
   c) the movable jaw assembly including a one-way drive for releasably engaging and, when engaged, for advancing said movable jaw assembly along the slide bar, said movable jaw assembly being subject to advancement toward and away from said fixed jaw when said one-way drive is disengaged;
   d) said one-way drive having a driving lever, and a braking lever normally engaging said slide rod, said braking lever when engaging said slide bar preventing motion of said movable jaw away from said fixed jaw, and when disengaging said slide bar allowing advancement of said movable jaw away from said fixed jaw, said braking lever having an engaging portion extending outwardly from said movable jaw assembly;
   e) a trigger handle pivotally mounted to said movable jaw assembly rearwardly of said braking lever and contacting said driving lever;
   f) said engaged driving lever moving said slide rod and said movable jaw toward said fixed jaw;
   g) said movable jaw assembly including a handgrip, a trigger-type relationship existing between said trigger handle and said handgrip, said bar clamp gripped at said handgrip, said braking lever and the trigger handle selectively operable by the same hand in such a manner that one of the index and middle fingers is positioned on the engaging portion of the braking lever to actuate the braking lever, while the other fingers encircle and contain the trigger handle and the handgrip;

i) said light fixture mounted to the fixed portion at a location on the fixed jaw;

j) a second light fixture mounted to the fixed portion at a free end of the slide bar, said free end at an opposite extreme of the slide bar from the fixed jaw, one of said light fixtures provided as a primary light fixture and the other of said light fixtures provided as a secondary light fixture;

k) each of said light fixtures including a cavity for housing a light source, an electrical contacts for the light source, an opening in said fixture to said cavity, a lens disposed over said opening, a guard disposed over said lens, a reflector for directing light, an electrical power cord connection having power cord wires therein, and a ground wire electrically connected to said fixture; and l) said primary light fixture including a connector on said electrical power cord connection for connecting said lamp to a power source, and a further power connection for connecting said electrical power cord connection of the secondary light fixture when the primary light fixture is connected.

4. The portable lamp of claim 3, comprising:

each of said light fixtures including as the electrical contacts for the light source, a pair of contacts on each side of said cavity for receiving the elongate halogen light source, said pair of contacts including one spring biased contact.

5. The portable lamp of claim 1, wherein said slide bar and attached movable jaw move together and subject to reciprocal motion toward and away from said fixed jaw when said one way drive is disengaged by application of external forces to said slide bar, said slide bar being capable of moving said movable jaw in continuous motion.

6. The portable lamp of claim 5, wherein said one-way drive advances said moving jaw toward said fixed jaw in increments.

7. The portable lamp of claim 1, wherein:

a) said braking lever has one end thereof pivotally connected to a support, and further biased for urging said braking lever into said engagement with said slide bar, withdrawal of said movable jaw away from said fixed jaw being prevented by said engagement, said braking lever being subject to release from engagement with said slide bar by application of an external force to the other end of said braking lever, said force counteracting said bias of the braking lever and pivoting said braking lever;

b) said one-way drive includes a driving lever normally disengaged from said slide rod, and a trigger handle pivotally mounted to said support means and contacting said driving lever, pivoting said handle in a first direction from a standby position forcing said driving lever into engagement with said slide rod, said engaged driving lever moving said slide rod and said movable jaw toward said fixed jaw;

c) said one-way drive further biased for normally urging said driving lever out of engagement with said slide bar, and for returning said trigger handle in a direction opposite to said first direction to said standby position after trigger handle operation; and d) the distance of said slide bar advance for each actuation of said handle is directly related to the magnitude of handle motion and said engagements between said levers and said slide bar result from mechanical interference with binding between said bar and levers.

8. The portable lamp of claim 1, comprising:

a) each said light fixture being positionable to apply light energy to a workpiece held by pivoting said light fixture toward the workpiece.

9. A lamp, comprising:

a) a halogen light fixture;

b) a bar clamp connected to said halogen light fixture by an articulating connection, said bar clamp having a fixed portion including a slide bar and a fixed jaw fixed to the slide bar;

c) a movable jaw carried by a movable jaw assembly for opposing said fixed jaw, said movable jaw assembly resting on said slide bar, and movable along said slide bar to bring said movable jaw toward and away from said fixed jaw;

d) the movable jaw assembly including a one-way drive for releasably engaging and, when engaged, for advancing said movable jaw assembly along the slide bar, said movable jaw assembly being subject to advancement toward and away from said fixed jaw when said one-way drive is disengaged;

e) said one-way drive having a driving lever, and a braking lever normally engaging said slide rod, said braking lever when engaging said slide bar preventing motion of said movable jaw away from said fixed jaw, and when disengaging said slide bar allowing advancement of said movable jaw away from said fixed jaw, said braking lever having an engaging portion extending outwardly from said movable jaw assembly;

f) a trigger handle pivotally mounted to said movable jaw assembly rearwardly of said braking lever and contacting said driving lever;

g) said engaged driving lever moving said slide rod and said movable jaw toward said fixed jaw;

h) said movable jaw assembly including a handgrip, a trigger-type relationship existing between said trigger handle and said handgrip, said bar clamp gripped at said handgrip, said braking lever and the trigger handle selectively operable by the same hand in such a manner that one of the index and middle fingers is positioned on the engaging portion of the braking lever to actuate the braking lever, while the other fingers encircle and contain the trigger handle and the handgrip;

i) an electrical connection housing associated with said halogen light fixture and attachable to the clamp;

j) halogen light source wires extending out of said halogen light fixture into said electrical connection housing for supplying electricity to said halogen light source; and k) a second light fixture mounted to the fixed portion at a free end of the slide bar by a second articulating connection, said free end at an opposite extreme of the slide bar from the fixed jaw, one of said light fixtures provided as a primary light fixture and the other of said light fixtures provided as a secondary light fixture;

l) each of said light fixtures including a cavity for housing a light source, electrical contacts for the light source, an opening in said fixture to said cavity, a lens disposed over said opening, a guard disposed over said lens, a reflector for directing light, an electrical power cord connection having power cord wires therein, and a ground wire electrically connected to said fixture; and m) said primary light fixture including a connector on said electrical power cord connection for connecting said lamp to a power source, and a further power connection for connecting said electrical power cord connection of the secondary light fixture when the primary light fixture is connected.

10. The portable lamp of claim 9, comprising:

each of said light fixtures including as the electrical contacts for the light source, a pair of contacts on each side of said cavity for receiving the elongate halogen light source, said pair of contacts including one spring biased contact.

11. The lamp of claim 9, wherein said light fixture, support member and said bar clamp are made of metal, said power cord including a ground wire electrically connected thereto.

12. The lamp of claim 9, wherein said electrical connection housing is disposed in said support member, said light source wires passing from said light fixture to said electrical connection housing.

13. The lamp of claim 9, comprising a switch mounted to said electrical connection housing of at least the primary light fixture, and enabling control of lighting from the lamp.

14. The lamp of claim 9, comprising an electrical socket mounted to said electrical connection housing of at least the primary light fixture, whereby the secondary light fixture may be connected to the primary light fixture in order to establish said further power connection for connecting said electrical power cord connection of the secondary light fixture when the primary light fixture is connected.

15. The lamp of claim 9, comprising an electrical socket mounted to said electrical connection housings of the light fixtures, whereby the secondary light fixture may be connected to the primary light fixture in order to establish said further power connection for connecting said electrical power cord connection of the secondary light fixture when the primary light fixture is connected, and the socket on the secondary light fixture may be used as an extension outlet.

16. The lamp of claim 9, comprising said electrical connection housing including water seals.

17. The lamp of claim 9, said articulating connections permitting movement of said halogen light fixtures in a direction which directs light energy from the light fixtures to a workpiece held by the bar clamp.

18. The lamp of claim 9, comprising said articulating connections for said primary light fixture and said secondary light fixtures positioned on the bar clamp so that, the clamp secured to a structure positions the primary light fixture on one side of the structure and the second light on the other side of the structure, and said articulating connections permit positioning of the light fixtures in directions so that one of the primary and secondary light fixtures directs light past the structure.

* * * * *